Nov. 21, 1933.  J. R. BRANT  1,935,902
METHOD AND APPARATUS FOR GASSING AND PLUGGING
TELEPHONE CABLES AND THE LIKE
Filed Jan. 25, 1932  2 Sheets-Sheet 1
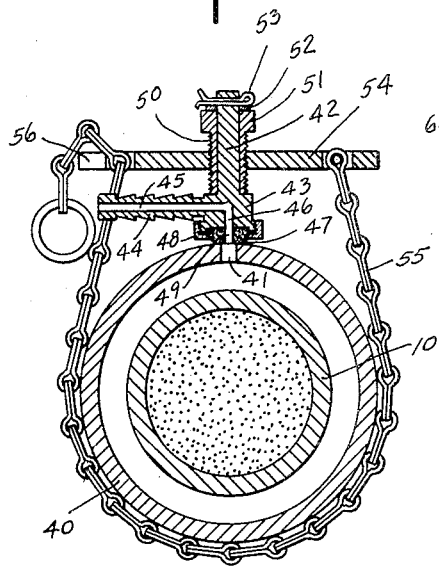
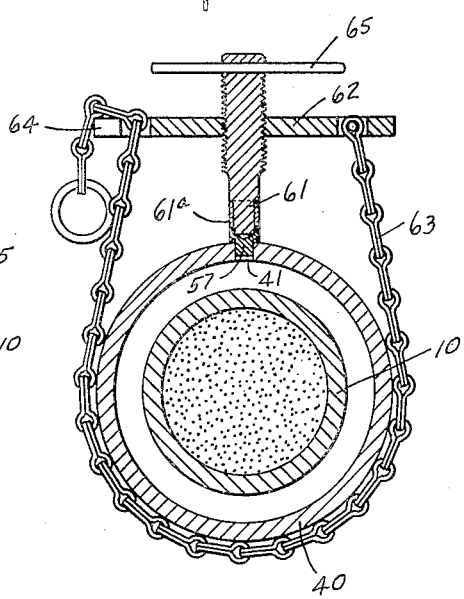
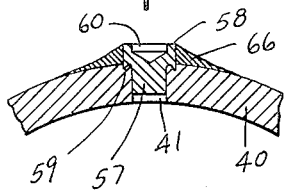
INVENTOR.
JOHN R. BRANT.
BY
Lockwood Lockwood Goldsmith & Galt
ATTORNEYS.

Nov. 21, 1933.                J. R. BRANT              1,935,902
        METHOD AND APPARATUS FOR GASSING AND PLUGGING
                  TELEPHONE CABLES AND THE LIKE
                    Filed Jan. 25, 1932         2 Sheets-Sheet 2
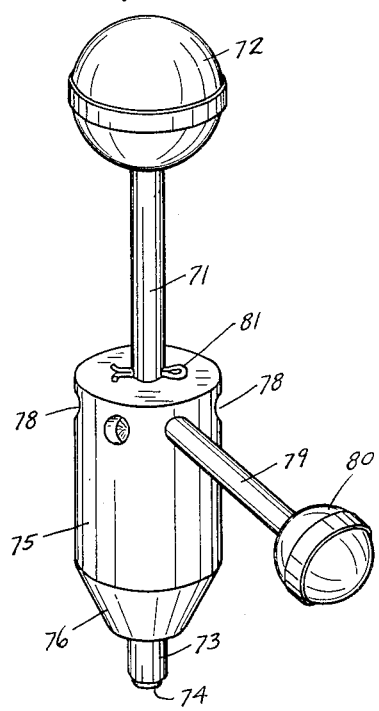
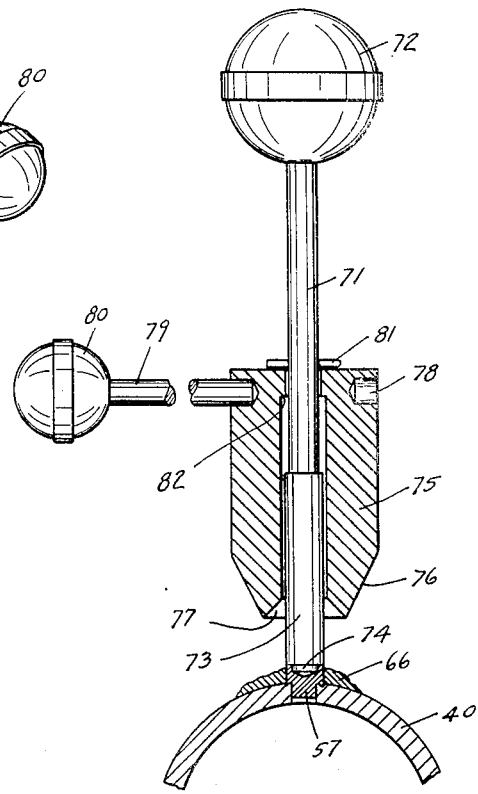
INVENTOR.
JOHN R. BRANT.
BY
Lockwood Lockwood Goldsmith & Galt
ATTORNEYS.

Patented Nov. 21, 1933

1,935,902

UNITED STATES PATENT OFFICE 1,935,902

METHOD AND APPARATUS FOR GASSING AND PLUGGING TELEPHONE CABLES AND THE LIKE

John R. Brant, Indianapolis, Ind.

Application January 25, 1932. Serial No. 588,599

5 Claims. (Cl. 137—99)

This invention relates to a method and apparatus for gassing and plugging telephone cables and the like.

It is common practice to introduce a gas under pressure into a telephone cable for the purpose of testing the same for leaks and for the purpose of preventing the entrance of moisture through small imperfections in the sheath. When it is desired to maintain the gas pressure in the cable throughout the life of the cable, it is common practice to fasten valves to the cable sheath, said valves to be used for replenishing the supply of gas periodically and for the application of a gauge for testing the pressure for the location of leaks. When it is desired however to gas the cable only once for the purpose of testing it when first installed, it is desirable to avoid the expense necessary to attach permanent valve fittings to the cable. The present invention has for its object the provision of a method and apparatus for gassing the cable without the use of a permanent valve and for plugging the hole through which the gas is admitted while the cable is still under gas pressure.

The features of the method and a preferred form of apparatus for carrying out the said method will be apparent from the following specification and claims and the accompanying drawings.

Figure 1 is a sectional view through the splice sleeve of a telephone cable having apparatus attached thereto for gassing the cable without the application of a valve. This apparatus is used where the gassing is done for testing purposes only and where the hole through which the gas is introduced is to be fitted with a permanent plug instead of a valve after the gassing operation is complete. Figure 2 is a similar sectional view through a splice sleeve having apparatus attached thereto by means of which the gassing hole is plugged without the necessity of waiting for a reduction of the gas pressure within the cable. Figure 3 is a fragmentary sectional view showing the plug in place in the wall of the sleeve. Figure 4 is a perspective view of a special form of soldering iron used to give a smooth finish to the solder surrounding the plug. Figure 5 is a sectional view of this iron in place ready for use.

In the drawings there is shown a splice sleeve 40 having a telephone cable 10 entering the same in the usual manner. The wall of the sleeve 40 has drilled therein a hole 41 for the entrance of gas. The fitting to be used for gassing the sleeve includes a central stem 42 having an enlarged portion 43 upon which there is formed a toothed nipple 44 for the reception of the connecting hose from any suitable supply of the gas to be used. The nipple 44 is provided with a central internal passage 45 connecting with a downwardly extending passage 46 within the enlarged portion 43 of the stem 42. A hemispherical piece 47 of rubber or other resilient material is held against the undersurface of the stem 42 by means of a cap 48 threadedly engaged with the enlarged portion 43. The hemispherical piece 47 has a central opening 49 communicating with the passage 46 and the hole 41 in the sleeve. The stem 46 is surrounded by an externally threaded bushing 50 having an enlarged upper end 51, the outside surface of which is knurled. The stem 42 projects above the bushing 50 and is fitted with a washer 52 and cotter key 53 for maintaining the bushing upon the stem. The threads of the bushing 50 engage a tapped hole in an elongated brass plate 54. The plate 54 has fastened to one end thereof a length of chain 55 which passes around the sleeve 40 and engages a slotted opening 56 in the opposite end of the plate 54.

In the application of the gas fitting, the hemispherical rubber piece 47 is placed over the hole 41, the chain 55 is wrapped around the sheath and inserted in the slotted opening 56 and the bushing 50 is then rotated by means of the knurled upper portion 51 to press the hemispherical rubber piece against the surface of the sleeve 40, thereby making a gas-tight connection. Gas is then introduced through the passages 45, 46 and 49 until the desired pressure for testing the sleeve and cable is obtained. It is to be noted that the pressure exerted upon the rubber piece 47 is a direct downward pressure best adapted for making a gas-tight seal.

After the cable has been gassed and tested, the apparatus shown in Figure 1 is removed for the purpose of sealing the gassing hole 41. The types of plugs heretofore in use cannot be successfully soldered in place under pressure and, for that reason, it has been necessary to wait until the gas has escaped from the cable before the hole could be plugged and soldered. This requires ordinarily that at least two workmen must wait an hour and a half or more and results in a large waste of valuable time. Although many of these plugs can be driven or otherwise fastened in the hole to make a temporarily gas-tight seal, still when a hot soldering iron is applied to solder the plug in place, the unequal expansion of the metal of the splice sleeve and the metal of the plug destroys the tightness of the seal and permits the gas to bubble through the solder. This has made it practically impossible to secure a permanent gas-tight seal while any appreciable gas pressure remains in the cable. By the apparatus shown in Figure 2, however, the hole may be immediately plugged and soldered without waiting for the gas to escape.

In this apparatus, a brass plug 57 is inserted in the hole 41. The said plug has a lower portion of a diameter to be easily inserted in the hole and has an upper portion 58 of a larger diameter. The upper portion 58 is tinned so that solder will adhere thereto and is undercut as best shown in Figure 3 to produce a sharp cutting edge 59 around the lower circumference thereof. The upper portion 58 is also provided with a recess 60 for the reception of the reduced lower end of a stem 61. The stem 61 is externally threaded in its upper portion and engages a tapped hole in a plate 62 similar to the plate 54. The plate 62 is provided with a chain 63 fastened to one end thereof, passed around the sleeve 40 and inserted through the slotted opening 64 in the opposite end of said plate. The stem 61 is provided with a handle 65.

In the use of the plugging apparatus, the plug 57 is first inserted in the hole 41. The stem 61 is then engaged with the recess 60 in the plug, chain 63 is wrapped around the sleeve 40 and inserted in the slotted opening 54 and the stem 61 is rotated by means of the handle 65 to press the plug 57 downwardly. In the downward movement of the plug 57 the cutting edge of the upper portion 58 thereof is pressed into the metal of the sleeve 40 sufficiently to form a gas-tight seal so long as the pressure of the stem 61 is maintained. With the stem 61 still in place, a quantity of solder 66 is flowed around the upper portion 58 of the plug and serves to hold the plug in position. In this form of plug, the unequal expansion of the plug caused by the hot soldering iron, instead of destroying the gas-tight seal, causes the metal of the splice sleeve to be swedged into the undercut behind the cutting edge 59. This preserves instead of destroys the tightness of the seal and the solder is therefore free from the blow holes which would be caused by escaping gas with the forms of plugs heretofore in use. To prevent the solder from adhering to the stem 61, the lower end of the said stem is preferably made of aluminum or is fitted with an aluminum bushing 61a. When the solder 66 has solidified, the stem 61 is backed off and the apparatus is removed, leaving the plug 57 firmly in place.

While the plug may be tightly fastened in place with an ordinary soldering iron using the apparatus shown in Figures 1 and 2, still the presence of the chain 63 during the soldering operation interferes with the use of an ordinary iron sufficiently to prevent the formation of a neat, smooth surface on the solder. For that reason the finishing iron shown in Figures 4 and 5 is provided.

The said iron includes a central stem 71 having a ball handle 72 of a heat insulating material and having an enlarged lower portion 73 fitted with a projection 74 of the proper size to enter the recess 60 in the plug 57. Upon the stem 71 there is slidably mounted the iron proper 75 which is a cylindrical piece having a tapered lower end 76 formed with a countersunk recess 77 of the size and shape desired for the final size and shape of the solder 66. The iron proper is provided with a plurality of holes 78 adjacent its upper end into which there may be inserted a stem 79 having a heat insulating ball handle 80. The upward travel of the iron proper 75 upon the stem 71 is limited by means of a cotter key 81 passing through the stem 71 and the downward travel of the iron proper is limited by an internal shoulder 82 therein which is stopped by contact with the enlarged portion 73 of the stem 71 to prevent the iron proper from cutting into the metal of the sleeve.

In the use of this device, the iron proper 75 is first heated, the stem 79 is inserted in one of the holes and is used to raise the iron proper against the cotter key 81. The projection 74 is then placed in the recess in the plug 57, as best shown in Figure 5. A sufficient downward pressure is exerted on the ball 72 by the operator to maintain the gas-tight connection and the iron proper 75 is then lowered into contact with the solder 66 and is rotated by means of the handle 80 until a smooth conical form has been given to the mass of solder. In this operation, the operator is easily able to supply enough pressure to maintain the gas-tight relation of the plug 57. Since, as before stated, the form of the plug is such that the unequal expansion of the plug and sleeve serves to swedge the metal of the sleeve into the undercut behind the cutting edge 59 of the plug. It is also to be noticed that the iron proper 75 can not reach the sleeve 40 because of the shoulder 82 and, therefore, can do no damage to the said sleeve. While the iron is in place, any amount of excess solder which appears about the lower edge of the iron may be wiped off and the iron may then be withdrawn, leaving a neat, smooth surface on the mass of solder.

The invention claimed is:

1. A method of plugging a hole in a cable sheath including the steps of inserting a plug in said hole, said plug having an annular cutting edge engageable with the outer surface of said sheath surrounding said hole, forcing said cutting edge into said surface and clamping said plug in place against the gas pressure within the cable, and flowing solder about a protruding portion of said plug while so clamped to make a permanent seal.

2. A method of plugging a hole in a cable sheath including the steps of inserting a plug in said hole, said plug having an annular cutting edge engageable with the outer surface of said sheath surrounding said hole, forcing said cutting edge into said surface and clamping said plug in place against the gas pressure within the cable, flowing solder about a protruding portion of said plug while so clamped to make a permanent seal, removing the clamping mechanism and smoothing the surface of the solder.

3. Apparatus for plugging a hole in a cable sheath or the like including a plug having a portion insertable in said hole and having an annular cutting edge engageable with the outer surface of said sheath around said hole, and means for pressing said cutting edge into said surface and maintaining the same in position against gas pressure within the cable while said plug is being soldered in place.

4. Apparatus for plugging a hole in a cable sheath or the like including a plug having a portion insertable in said hole, having an annular cutting edge engageable with the outer surface of said sheath around said hole and having an undercut portion adjacent said cutting edge, and means for pressing said cutting edge into said surface to force the material of said sheath into said undercut portion, said means also serving to maintain said plug in position against gas pressure within the cable while said plug is being soldered in place.

5. A plug for plugging a hole in a cable sheath or the like, said plug having a portion insertable in said hole, a cutting edge engageable with the outer surface of said sheath around said hole, and a portion protruding above the surface of said sheath when said cutting edge is forced into said surface, said last mentioned portion serving as an anchorage for the adherence of solder to hold the plug permanently in place in the hole.

JOHN R. BRANT.